Figure 1:
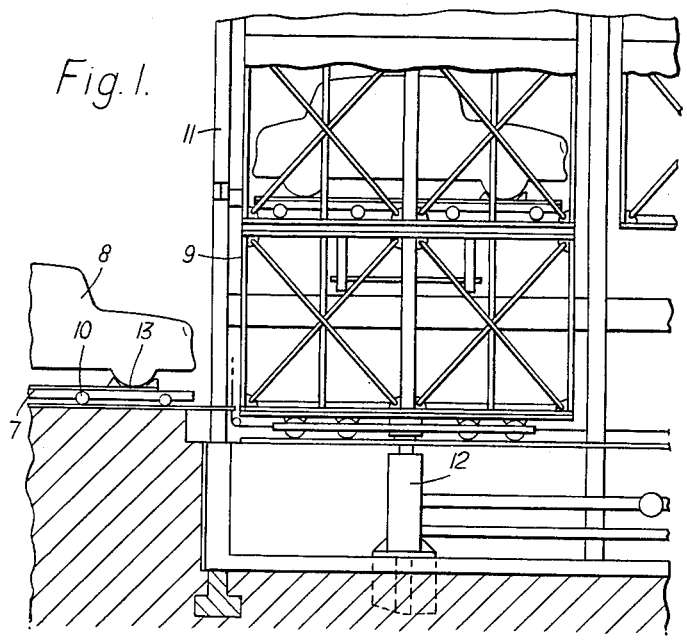

Dec. 7, 1965     E. O'SULLIVAN     3,221,907
CHOCKING DEVICE FOR VEHICLE WHEELS
Filed June 17, 1963     3 Sheets-Sheet 1

Inventor
Eugene O'Sullivan
By
Watson, Cole, Grindle & Watson
Attorneys

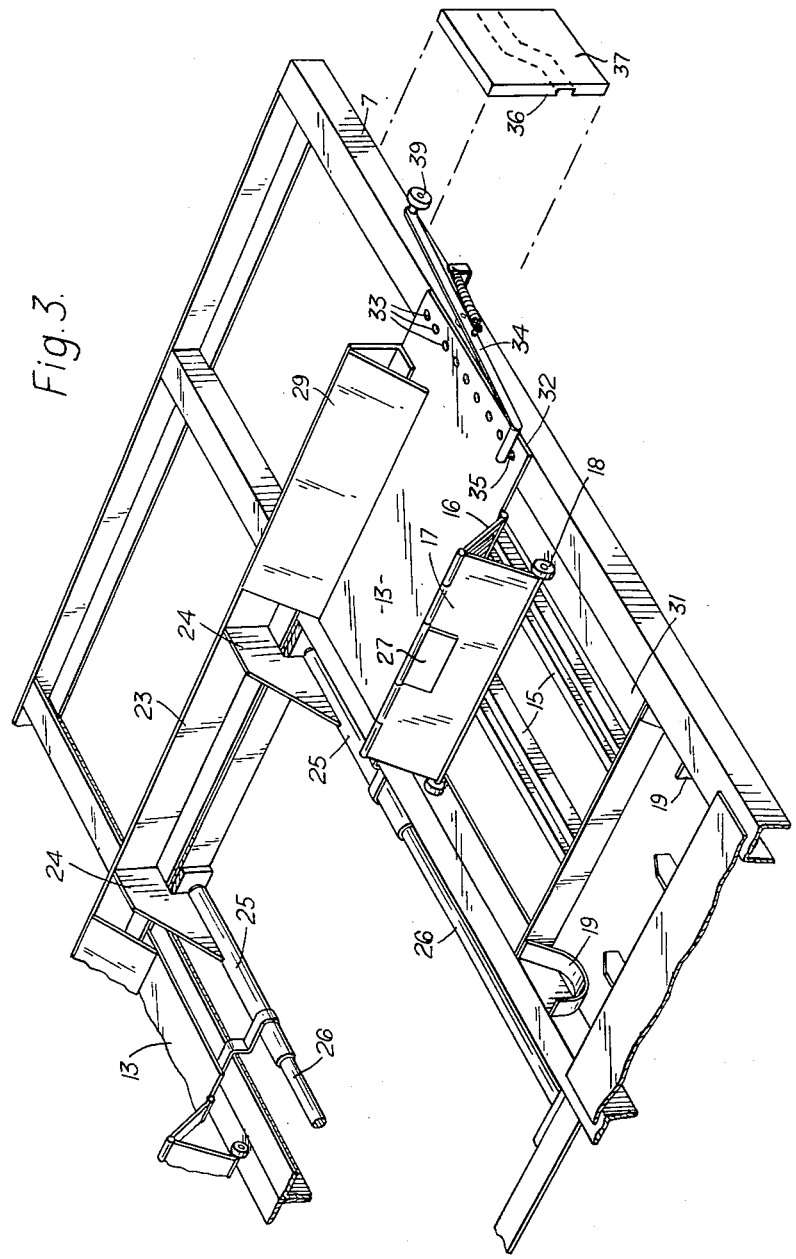

United States Patent Office 3,221,907
Patented Dec. 7, 1965

---

3,221,907
CHOCKING DEVICE FOR VEHICLE WHEELS
Eugene O'Sullivan, Orpington, Kent, England, assignor to New Era Multi Park Holding Limited
Filed June 17, 1963, Ser. No. 288,378
Claims priority, application Great Britain, June 20, 1962, 23,722/62
3 Claims. (Cl. 214—42)

The present invention relates to apparatus for the storage or garaging of motor vehicles and is particularly concerned with apparatus wherein motor vehicles are handled on platforms by which the vehicles without their occupants can be inserted into storage areas or into cages adapted to be stacked one upon the other by methods similar to those described in U.S. Patent No. 3,085,700 and in copending application Serial No. 80,435 now matured as United States Patent 3,110,466, although the invention is not limited to this particular type of equipment.

The present invention is more particularly directed to the provision of means for preventing inadvertent movement of motor vehicles mounted on such platforms and it comprises a movable support member adapted to receive a wheel or a pair of wheels at the front or rear of a vehicle, which member is adapted to move relatively to the platform by the action of a vehicle passing on to or away from the platform, and incorporates chocking means engageable with the wheel or wheels to prevent movement on the support member and locking means adapted to secure said member to the platform after the vehicle has reached a required position on the platform.

Apparatus for the storage or garaging of motor vehicles according to the invention comprises a platform adapted to receive a motor vehicle, the platform with the vehicle thereon being then inserted into a storage area, a movable support member on said platform adapted to receive a vehicle wheel, said member being adapted to move relatively to the platform, chocking means engageable with the vehicle wheel or wheels and mounted on the support member to prevent movement of the vehicle wheel on the support member, and locking means to secure said member to the platform after the vehicle has reached a predetermined position on the platform.

The slidable member carries a fixed engagement surface at one end and a pivotally movable engagement surface at the other end, which comprises a first plate which in one position of the slidable member lies in the same plane as the surface of said member, and the second plate lies beneath said first plate, the two plates being pivoted together and arranged for limited angular movement so that as the slidable member moves forward as the leading wheel of a vehicle runs on to the slidable member, the two plates rise behind the wheel to serve as a rear chocking member.

The second plate may carry guide rollers at each side which are adapted to enter channelled guide members in the said one position of the slidable member, forward movement of the slidable member causing the first and second plates to rise behind the wheel in inverted V-form while the wheels run on support surfaces.

The locking means may comprise a pivoted arm associated with the platform and having a locking pin adapted to enter any of a series of apertures in an angle member, said arm being moved into or out of the locking position by means of a cam, wedges, wedge-shaped guides or the like, mounted in a fixed position relatively to the storage area whereby the locking pin is moved into the locking position as the vehicle moves into the storage area and is disengaged as the vehicle moves out of the storage area.

Figure 4:
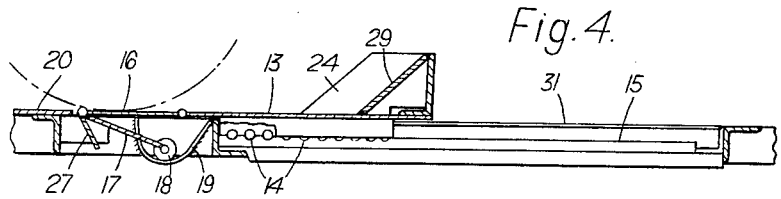
Figure 5:
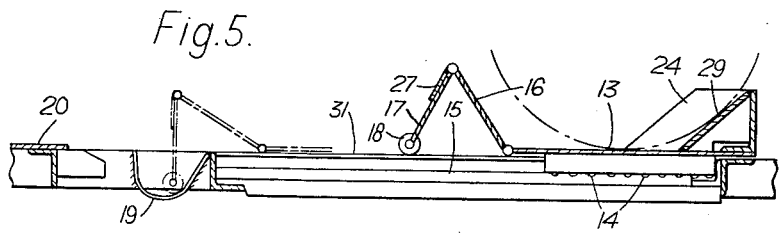
Figure 2:
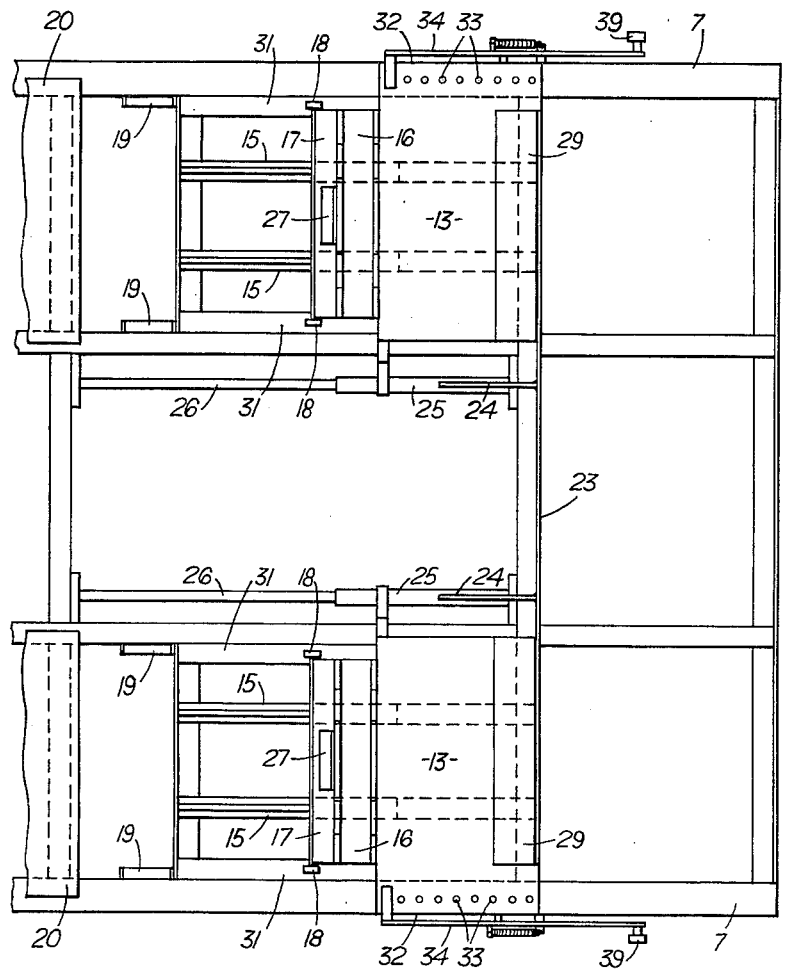

One embodiment of storage or garaging apparatus according to the present invention is shown by way of example on the accompanying drawings in which:

FIG. 1 shows diagrammatically one type of apparatus to which the features of the present invention are applicable with a vehicle loading platform shown ready for insertion into a cage, FIG. 2 shows part of a platform according to the invention, FIG. 3 is a perspective view on a larger scale showing part of the platform with the slidable members moved towards a front chocking position by a vehicle run on to the platform, the vehicle being however omitted in FIGS. 2 to 5 to show the arrangement more clearly, and FIGS. 4 and 5 are detail views showing the sliding chocking member in two different positions.

The present invention relates particularly to the construction of platforms 7 adapted to receive motor vehicles 8 and by which each vehicle is adapted to be moved into a cage 9 supported between rows of vertical columns 11 so that, after a cage 9 has been loaded, a column of such cages may be moved upwardly by means of a hydraulic ram 12 and an empty cage can then be transferred to a position at the bottom of the column ready for receiving a platform 7 bearing the next vehicle 8 to be stored. Conveniently and as explained in Patent No. 3,085,700 two vertical columns are provided side-by-side, a vehicle at the top of one column being adapted to be shifted to the top of the other column while a cage at the bottom of said other column is being shifted to the bottom of the first column.

The manipulation of vehicles 8 on the platform 7 is advantageous because the cages need be no wider than is required to accept a vehicle with the doors closed, but means must be provided to prevent inadvertent movement of the vehicle on the platform. For this purpose the platform 7 comprises a horizontal framework carrying support wheels 10 and for the major part of its length it embodies a support surface or surfaces 20 on which the vehicle wheels run as the vehicle 8 is brought into position. These surfaces terminate towards the front and are continued by a slidably movable member 13 on each side. These members 13 are shown in FIGS. 2, 3 and 5 in their forward positions which they would adopt after the vehicle has been moved forward to an approximately central position on the platform, but it should be understood that these positions would only be adopted when the vehicle is in position, although the wheels of the vehicle are not shown on FIGS. 2, 3 and 5. The member 13 comprises series of rollers 14 adapted to run on channelled rails 15 and the two members 13 are connected by a transversely extending connector bar 23. Angle brackets 24 are welded to the strip 23 and these brackets are welded to sleeves 25 slidable on guide rods 26 to provide for an adequate guiding of the slidable members 13. At the front of each slidable member there is provided a chock plate 29 against which the vehicle wheel is adapted to rest and to act as a stop to the wheel.

Hinged to the rear edge of each slidable member 13 is a plate 16 which in the rearward position of the member 13 provides a continuous running surface for the vehicle wheels between the surface 20 and the surface of the member 13. Hingedly connected to the rear edge of the plate 16 is another plate 17 of about the same dimensions, the free edge of which carries a cross bar having guide wheels 18 at its ends. These wheels are adapted to rest in channeled guides 19 in the FIG. 4 position. Fixedly associated with the plate 16 near the hinge joint of plate 17 and at a predetermined acute angle to the plate 16 is a stop lug 27, the plate 17 being adapted to swing in the angle between the plate 16 and the lug 27.

As a vehicle 8 runs on to the platform 7 with the members 13 initially in the position shown in FIG. 4, it will be seen that the leading wheel runs over the plate 16 on to the member 13 and then presses against the chock plate 29 whereupon further movement of the vehicle causes the member 13 to move forward on the rollers 14. The forward movement of the hinge connecting the member 13 to the plate 16 and the hinged connection between the plates 16 and 17 causes the plate 16 to turn clockwise (as seen in FIG. 4) with the rollers 18 initially remaining in the channel 19 until these parts are in an inverted V position (dotted line position in FIG. 5), whereupon the rollers 18 travel along a guide plate 31 forming part of the slidable movable member 13 and forming a forward continuation of the channeled guide 19. When this position is reached the plate 17 engages the lug 27 and further pivotal movement between the plates 16 and 17 cannot occur and consequently the rollers 18 are lifted out of the channels 19 onto a horizontal guide surface 31 in the position shown in full lines in FIG. 5. The plates 16 and 17 are now supported behind the leading wheel of the vehicle as shown in FIG. 5 and the wheels are thus chocked and inadvertent movement is prevented relatively to the sliding members 13.

The latter are adapted to be fixed to the platform 7 as soon as the latter moves into the cage 9, this movement being effected by hydraulic or pneumatic ram device which is not illustrated on the drawings as it forms no part of the present invention. Locking of the members 13 to the platform 7 is effected by the provision of a projecting plate 32 on one or both of the slidable members 13, which is movable closely over a side frame portion of the main frame, and includes a series of locking apertures 33. A pivotally movable arm 34 mounted on the frame of the platform 7 embodies a locking pin 35 adapted to enter one of the apertures 33. A roller or other equivalent means 39 on the arm 34 is adapted to co-operate with fixed wedges, a cam track or the like 36 in a member 37 suitably mounted near the storage area, for example, on one of the columns 11, so that as the platform moves into the cage 9 the arm 34 is tilted to lock the plate 32 to the framework of the platform 7 by reason of the pin entering one of the apertures 33 or the pin 35 is free to enter one of the apertures 33 if the vehicle moves slightly on the platform 7.

When the platform 7 is moved out of the cage line the reverse action occurs, the locking pin being disengaged from the respective aperture 33. A toggle spring 38 may be provided to hold the arm 34 in either position.

It will of course be understood that a vehicle 8 will normally be placed approximately centrally on the platform 7, and for this purpose the slidable members 13 are not necessarily moved forward to the limit position indicated on FIGS. 3 and 5; for a relatively small vehicle the slidable member 13 may rest in a position where the roller 18 has only moved a little way along the guide surface 31 after leaving the channel 19.

What I claim is:

1. A vehicle handling conveyor comprising a fixed frame member, a supporting track carried by said frame member, a platform member shiftable upon said track and adapted to receive the wheels of a vehicle, a slidable member at one end of said platform member to receive and fully support a leading wheel of a vehicle as the vehicle reaches a central position on said platform member and to be moved on said platform member by engagement with said wheel, a first chocking member on said slidable member at the end remote from the oncoming wheel for engagement by said wheel to shift said slidable member on said platform member, a second chocking member at the other end of said slidable member, means to cause said second chocking member to pivot upwardly to an operative position by the motion of the slidable member as the vehicle moves on the platform member, the wheel being engaged between the first and second chocking members to prevent movement on the slidable member, and means to fix the slidable member to the platform member, a supporting member for the second chocking member, means pivotally connecting the second chocking member to said supporting member, means to limit relative rotary movement between the second chocking member and the member, the second chocking member and the supporting member being together of inverted V-formation in the chocking position, a roller at the lower end of the supporting member, a guide surface for engaging said roller, said guide surface including a channelled depression to allow the second chocking member to lie in line with the slidable member in a starting position on said slidable member to allow the vehicle wheel to pass smoothly on to the slidable member and to cause the second chocking member to rise behind the wheel when the slidable members moves forwardly as the vehicle moves on to the platform member.

2. A vehicle handling conveyor comprising a fixed frame member, a supporting track carried by said frame member, a platform member shiftable upon said track and adapted to receive the wheels of a vehicle, a slidable member at one end of said platform member to receive and fully support a leading wheel of a vehicle as the vehicle reaches a central position on said platform member and to be moved on said platform member by engagement with said wheel, a first chocking member on said slidable member at the end remote from the oncoming wheel for engagement by said wheel to shift said slidable member on said platform member, a second chocking member at the other end of said slidable member, means to cause said second chocking member to pivot upwardly to an operative position by the motion of the slidable member as the vehicle moves on the platform member, the wheel being engaged between the first and second chocking members to prevent movement on the slidable member, support rollers on said slidable member, guide rails on the platform member, and adapted to receive said support rollers on the slidable member to support the slidable member with its upper surface in line with the platform member and cooperating locking parts on the platform member and on the slidable member respectively, and cooperating means on said platform member and said fixed frame member constructed and arranged to come into operative contact toward the end of the shifting movement of the platform member, to bring said locking parts into locking engagement.

3. A vehicle handling conveyor comprising a fixed frame member, a supporting track carried by said frame member, a platform member shiftable upon said track and adapted to receive the wheels of a vehicle, a slidable member at one end of said platform member to receive and fully support a leading wheel of a vehicle as the vehicle reaches a central position on said platform member and to be moved on said platform member by engagement with said wheel, a first chocking member on said slidable member at the end remote from the oncoming wheel for engagement by said wheel to shift said slidable member on said platform, a second chocking member at the other end of said slidable member, means to cause said second chocking member to pivot upwardly to an operative position by the motion of the slidable member as the vehicle moves on the platform member, the wheel being engaged between the first and second chocking members to prevent movement on the slidable member, a locking plunger to fix the slidable member to the platform member when the platform member is shifted from its loading position, and actuator means for said locking plunger responsive to the movement of the platform member from the loading position to an alternative position to lock the slidable member to the platform member in said alternative position.

References Cited by the Examiner

UNITED STATES PATENTS

| 1,775,799 | 9/1930 | Young | 214—16.1 |
| 2,671,533 | 3/1954 | Taylor | 188—32 |
| 2,728,467 | 12/1955 | Glicker | 214—16.1 |

FOREIGN PATENTS

| 689,896 | 4/1953 | Great Britain. |

GERALD M. FORLENZA, *Primary Examiner.*
HUGO O. SCHULZ, *Examiner.*